United States Patent [19]
McEvoy et al.

[11] 3,876,786
[45] Apr. 8, 1975

[54] 6-(SUBSTITUTED PHENYL)-4,5-DIHYDRO-3(2H)-PYRIDAZINONES FOR LOWERING BLOOD PRESSURE IN MAMMALS

[75] Inventors: Francis Joseph McEvoy, Pearl River, N.Y.; George Rodger Allen, Jr., Old Tappan, N.J.

[73] Assignee: American Cyanamid Company, Stamford, Conn.

[22] Filed: Aug. 27, 1973

[21] Appl. No.: 391,699

Related U.S. Application Data

[63] Continuation of Ser. No. 255,492, May 22, 1972, abandoned.

[52] U.S. Cl. .................................................. 424/250
[51] Int. Cl. ............................................. A61k 27/00
[58] Field of Search .................................... 424/250

[56] References Cited
UNITED STATES PATENTS
3,475,431  10/1969  Bachmann ........................ 260/250

Primary Examiner—Jerome D. Goldberg
Attorney, Agent, or Firm—Edward A. Conroy, Jr.

[57] ABSTRACT

This disclosure describes compounds of the class of 6-(substituted-phenyl)-5-methyl-4,5-dihydro-3(2H)-pyridazinones useful as hypotensive agents.

12 Claims, No Drawings

6-(SUBSTITUTED PHENYL)-4,5-DIHYDRO-3(2H)-PYRIDAZINONES FOR LOWERING BLOOD PRESSURE IN MAMMALS

This is a continuation, of application Ser. No. 255,492, filed May 22, 1972, now abandoned.

BRIEF SUMMARY OF THE INVENTION This invention relates to new organic compounds and, more particularly, is concerned with novel 6-(substituted-phenyl)-5-methyl-4,5-dihydro-3(2H)-pyridazinones and with methods of preparing these compounds. The novel compounds of the present invention may be represented by the following general formula:

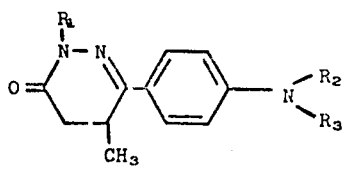

wherein $R_1$ is hydrogen or methyl, $R_2$ is methyl or ethyl, and $R_3$ is hydrogen or lower alkanoyl. Suitable lower alkanoyl groups contemplated by the present invention are those having up to four carbon atoms such as formyl, acetyl, propionyl, n-butyryl and isobutyryl.

DETAILED DESCRIPTION OF THE INVENTION

The novel compounds of the present invention are generally obtainable as white crystalline materials having characteristic melting points and absorption spectra and which may be purified by recrystallization from common solvents such as water, ethanol, acetone and mixtures thereof. They are soluble in many organic solvents such as ethyl acetate, chloroform, dimethylformamide, and the like but are relatively insoluble in nonpolar solvents such as hexane and diethyl ether.

The novel compounds of the present invention may be readily prepared from methyl 3-(p-2,2,2-trifluoroacetamidobenzoyl)butyrate (I) as set forth in the following reaction scheme:

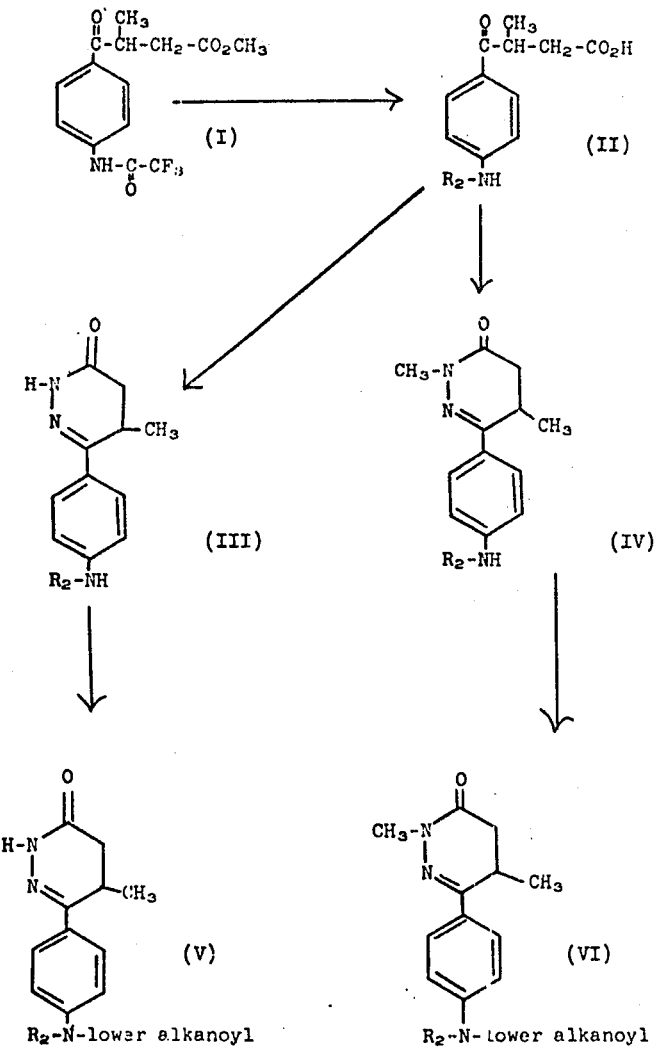

wherein $R_2$ is methyl or ethyl. In accordance with the above reaction scheme, the trifluoroacetanilide (I) may be converted into the β-(p-lower alkylaminobenzoyl)-butyric acids (II) by conversion to the anion with a base such as powdered potassium hydroxide and alkylation with methyl iodide or ethyl iodide. If the alkylating agent is methyl iodide, the reaction is substantially complete within 5 minutes at steam bath temperature. However, the reaction with ethyl iodide requires a time of at least 60 minutes when conducted at steam bath temperature. Condensation of a β-(p-lower alkylaminobenzoyl)butyric acid (II) with hydrazine provides the corresponding 6-(p-lower alkylaminophenyl)-5-methyl-4,5-dihydro-3(2H)-pyridazinone (III) whereas condensation of (II) with methylhydrazine provides the corresponding 6-(p-lower alkylaminophenyl)-2,5-dimethyl-4,5-dihydro-3-(2H)-pyridazinone (IV). This condensation, with either hydrazine or methylhydrazine, is best carried out in ethanol as solvent at the reflux temperature for a few hours. Treatment of the 4,5-dihydro-3(2H)-pyridazinones of formulae (III) and (IV) with a lower alkanoyl halide or anhydride (such as formyl acetyl anhydride, acetic anhydride, propionic anhydride, n-butyryl bromide, or isobutyryl chloride) at 25°–100°C. provides the products of formulae (V) and (VI).

Typical compounds of the present invention which may be thus prepared are, for example, 6-(p-ethylaminophenyl)-5-methyl-4,5-dihydro-3(2H)-pyridazinone, 6-(N-methyl-p-propionamidophenyl)-5-methyl-4,5-dihydro-3(2H)-pyridazinone, 6-(N-methyl-p-isobutyramidophenyl)-5-methyl-4,5-dihydro-3(2H)pyridazinone, 6-(N-ethyl-p-formamidophenyl)-5-methyl-4,5-dihydro-3-(2H)-pyridazinone, 6-(N-ethyl-p-n-butyramidophenyl)-5-methyl-4,5-dihydro-3(2H)-pyridazinone, 6-(N-methyl-p-formamidophenyl)-2,5-dimethyl-4,5-dihydro-3(2H)-pyridazinone, 6-(N-methyl-p-n-butyramidophenyl)-2,5-dimethyl-4,5-dihydro-3(2H)-pyridazinone, 6-(N-ethyl-p-acetamidophenyl)-2,5-dimethyl-4,5-dihydro-3(2H)-pyridazinone, and 6-(N-ethyl-P-propionamidophenyl)-2,5-dimethyl-4,5-dihydro-3(2H)-pyridazinone.

The novel compounds of the present invention have long lasting hypotensive activity which was demonstrated in the following test procedure. Conscious male albino Sherman strain rats averaging approximately 250 grams in weight were fastened to rat boards in a supine position by means of canvas vests and limb ties. The femoral areas were anesthized (subcutaneous infiltration of lidocaine), and the left or right common iliac arteries were exposed and clamped off proximally be an artery clamp and distally with thread. Incisions were made near the tie and short nylon catheters were inserted and tied in place. The other end of the catheters were fitted with 24 gauge hubless needles attached to thick-walled polyethylene tubes. The test compounds were administered to the animals orally by gavage (stomach tube). The test compounds were ordinarily suspended or dissolved in 2 percent aqueous starch solution, one milliliter of which gave, per 100 grams of body weight, the desired dose. Mean arterial blood pressure was measured 4 and 24 hours after administration of the compounds. Comparisons were then made to the mean control pressure of 122 mm. of mercury which is the average of a number of controls recorded over months of testing. Blood pressure measurements were made with four Statham P23 Db strain gauges (Statham Instruments, Inc. Los Angeles, Calif.), attached to a Sanborn Polyviso Recorder equipped with four strain gauge preamplifiers with averaging circuits for measuring mean arterial pressure.

Table I below summarizes the activity of typical compounds of the present invention and compares them with two previously disclosed compounds. It is obvious from an examination of Table I that the compounds of this invention (Nos. 1 through 10) possess hypotensive activity which is considerably longer lasting than that of the previously disclosed compounds, (No. 11 and 12).

TABLE I

| Compound* | No. of Rats | Median Arterial Blood Pressure (mm. of Hg) | |
|---|---|---|---|
| | | 4 Hours | 24 Hours |
| 1. 6-(p-methylaminophenyl)-5-methyl-4,5-dihydro-3(2H)-pyridazinone | 4 | 77 | |
| 2. 6-(p-methylaminophenyl)-5-methyl-4,5-dihydro-3(2H)-pyridazinone | 3 | | 100 |
| 3. 6-(N-methyl-p-acetamidophenyl)-5-methyl-4,5-dihydro-3(2H)-pyridazinone | 2 | 64 | |
| 4. 6-(N-methyl-p-acetamidophenyl)-5-methyl-4,5-dihydro-3(2H)-pyridazinone | 1 | | 90 |
| 5. 6-(N-ethyl-p-acetamidophenyl)-5-methyl-4,5-dihydro-3(2H)-pyridazinone | 2 | 68 | |
| 6. 6-(N-ethyl-p-acetamidophenyl)-5-methyl-4,5-dihydro-3(2H)-pyridazinone | 1 | | 102 |
| 7. 6-(p-methylaminophenyl)-2,5-dimethyl-4,5-dihydro-3(2H)-pyridazinone | 4 | 93 | |
| 8. 6-(p-methylaminophenyl)-2,5-dimethyl-4,5-dihydro-3(2H)-pyridazinone | 2 | | 106 |
| 9. 6-(N-methyl-p-acetamidophenyl)-2,5-dimethyl-4,5-dihydro-3(2H)-pyridazinone | 2 | 66 | |
| 10. 6-(N-methyl-p-acetamidophenyl)-2,5-dimethyl-4,5-dihydro-3(2H)-pyridazinone | 1 | | 100 |
| 11. 6-(p-acetamidophenyl)-4,5-dihydro-3(2H)-pyridazinone | 3 | 77 | 119 |
| 12. 6-(p-aminophenyl)-4,5-dihydro-3(2H)-pyridazinone** | 3 | 79 | 110 |
| 13. Controls | 25 | 123 | 122 |

* All compounds dosed at 100 mg./kg. of body weight.
** Disclosed in U.S. Patent No. 3,475,431.

The novel compounds of the present invention wherein $R_3$ is hydrogen are organic bases and thus are capable of forming acid-addition salts with a variety of non-toxic organic and inorganic salt-forming reagents. Thus, acid-addition salts, formed by admixture of the organic free bases with an acid, suitably in a neutral solvent, are formed with such acids as sulfuric, phosphoric, hydrochloric, hydrobromic, sulfamic, citric, lactic, malic, succinic, tartaric, acetic, benzoic, gluconic, ascorbic, and related acids. For purposes of this invention the free bases are equivalent to their non-toxic acid-addition salts.

The 6-(substituted-phenyl)-5-methyl-4,5-dihydro-3(2H)-pyridazinones of the present invention may be administered either orally or parenterally. The amount of a single dose or of a daily dose to be given will vary but should be such as to give a proportionate dosage of from about one mg. to about 15 mg. per kilogram of body weight per day. Thus, such dosage units are employed that a total of from about 50 mg. to about 1.0 g. for a subject of about 70 kg. body weight are administered in a 24 hour period. This dosage regimen may be adjusted to provide the optimum therapeutic response, for example, several doses of 25–250 mg. may be administered daily or the dose may be proportionately reduced as indicated by the exigencies of the therapeutic situation.

The 6-(substituted-phenyl)-5-methyl-4,5-dihydro-3-(2H)-pyridazinones may be orally administered, for example, with an inert diluent or with assimilable edible carrier, or they may be enclosed in hard or soft gelatin capsules, or they may be compressed into tablets, or they may be incorporated directly with the food of the diet. For oral therapeutic administration, the novel compounds of this invention may be incorporated with excipients and used in the form of tablets, troches, capsules, elixirs, suspensions, syrups, wafers, and the like. Such compositions and preparations should contain at least 0.1% of active compound. The percentage in the compositions and preparations may, of course, be varied and may conveniently be between about 5% to about 75% or more of the weight of the unit. The amount of active compound in such therapeutically useful compositions or preparations is such that a suitable dosage will be obtained. Preferred compositions or preparations are prepared so that an oral dosage unit form contains between about 25 and 250 milligrams of active compound.

The tablets, troches, pills, capsules and the like may also contain the following: a binder such as gum tragacanth, acacia, corn starch or gelatin; an excipient such as dicalcium phosphate; a disintegrating agent such as corn starch, potato starch, alginic acid and the like; a lubricant such as magnesium stearate; and a sweetening agent such as sucrose, lactose, or saccharin may be added or a flavoring agent such as peppermint, oil of wintergreen, or cherry flavoring. When the dosage unit form is a capsule, it may contain in addition to materials of the above type a liquid carrier such as a fatty oil. Various other materials may be present as coatings or to otherwise modify the physical form of the dosage unit, for instance, tablets, pills or capsules may be coated with shellac, sugar, or both. A syrup or elixir may contain the active compounds, sucrose as a sweetening agent, methyl and propyl parabens as preservatives, a dye and a flavoring such as cherry or orange flavor. Of course, any material used in preparing any dosage unit form should be pharmaceutically pure and substantially non-toxic in the amounts employed.

Compositions having the desired clarity, stability, and adaptability for parenteral use are obtained by dissolving from 0.10% to 10.0% by weight of a 6-(substituted-phenyl)-5-methyl-4,5-dihydro-3(2H)-pyridazinone in a vehicle consisting of a mixture of non-volatile, normally liquid polyethylene glycols which are soluble in both water and organic liquids and which have molecular weights of from about 200 to about 1500. Such mixtures of polyethylene glycols are commercially available and are usually obtained by condensing glycol with ethylene oxide. Although the amount of 6-(substituted-phenyl)-5-methyl-4,5-dihydro-3(2H)-pyridazinone dissolved in the above vehicle may vary from 0.10% to 10.0% by weight, it is preferred that the amount employed be from about 3.0% to about 9.0% by weight. Although various mixtures of the aforementioned non-volatile polyethylene glycols may be employed, it is preferred to use a mixture of non-volatile polyethylene glycols having an average molecular weight of about 400. Such a mixture is usually referred to as polyethylene glycol 400. A preferred embodiment comprises a clear solution of from about 3.0% to about 9.0% by weight of the 6-(substituted-phenyl)-5-methyl-4,5-dihydro-3(2H)-pyridazinone dissolved in an aqueous solution of polyethylene glycol 400. In addition to the 6-(substituted-phenyl)-5-methyl-4,5-dihydro-3(2 H)-pyridazinone, the parenteral solutions may also contain various preservatives which may be used to prevent bacterial and fungal contamination or chemical degradation.

The novel compounds of the present invention possess an asymmetric carbon atom at the 5-position and hence may exist in more than one stereoisomeric form. It is to be understood that the present invention includes within its scope all such stereoisomeric forms.

The invention will be described in greater detail in conjunction with the following specific examples which are given solely for the purpose of illustration and are not to be construed as limitations of this invention.

EXAMPLE 1

Preparation of 4'-(3-dimethylamino-2-methylpropionyl)acetanilide

A solution of 21 g. (0.257 mol) of dimethylamine hydrochloride in 15.2 ml. (0.203 mol) of 37% aqueous formaldehyde is allowed to stand at room temperature for 30 minutes. To the solution is added 105 ml. (1.1 mol) of acetic anhydride and the mixture is swirled until a clear solution results and spontaneous gentle boiling begins. To the still warm solution is added 32.8 g. (0.172 mol) of p-acetamidopropiophenone and the mixture is heated on the steam-bath for 2 hours. The reaction mixture is evaporated on a waterbath at 55°–60°C. To the residue is added 350 ml. of acetone and the solution is boiled for 5 minutes, then evaporated. The residual gum is dissolved in 350 ml. of water and washed with three 250 ml. portions of methylene chloride. The aqueous solution is stirred in an ice-bath with 250 ml. of methylene chloride and rendered alkaline by the dropwise addition of 2.5N sodium hydroxide solution. The methylene chloride solution is separated and the aqueous solution is extracted with an additional 250 ml. of methylene chloride. The combined organic extract is washed with saline, dried and evaporated leaving 40 g. of 4'-(3-dimethylamino-2-methylpropionyl)acetanilide as an oil.

EXAMPLE 2

Preparation of [2-(p-acetamidobenzoyl)propyl]trimethylammonium iodide

A solution of 40 g. (0.16 mol) of 4'-(3-dimethylamino-2-methylpropionyl)acetanilide and 22 ml. (0.33 mol) of iodomethane in 400 ml. of acetone is stirred at reflux temperature for 18 hours. The mixture is cooled and 51.9 g. of methiodide, m.p. 206°–207°C., is collected by filtration.

EXAMPLE 3

Preparation of
4'-(3-cyano-2-methylpropionyl)acetanilide

To a stirred solution of 390 mg. (0.006 mol) of potassium cyanide in 20 ml. water is added 975 mg. (0.0025 mol) of [2-(p-acetamidobenzoyl)propyl] trimethylammonium iodide. An oil separates which gradually turns to a white solid during 4 hours of stirring. The solid is collected and washed liberally with water affording 500 mg. of nitrile, m.p. 122°–127°C. A similar preparation crystallized from acetone-petroleum ether has m.p. 131°–132°C.

EXAMPLE 4

Preparation of 3-(p-aminobenzoyl)butyric acid

A solution of 23.2 g. (0.1 mol) of 4'-(3-cyano-2-methylpropionyl)acetanilide and 230 ml. of 6N hydrochloric acid is stirred at reflux temperature for 1 hour. The solution is evaporated and the residue is triturated with acetone affording in, two crops, 28 g. of amino acid hydrochloride mixed with ammonium chloride. A 1.22 g. sample of this material is dissolved in 12 ml. of water and the solution is brought to pH 4 by the dropwise addition of 1.0 N sodium hydroxide solution. The ice-cooled solution deposits 690 mg. of white crystals, m.p. 119°–123°C. Recrystallization of this material from acetonebenzene raises the m.p. to 121°–123°C.

EXAMPLE 5

Preparation of methyl 3-(p-aminobenzoyl)butyrate

A solution of 3.0 g. of 3-(p-aminobenzoyl)butyric acid and 0.12 ml. sulfuric acid in 80 ml. of methanol is heated at reflux temperature for 18 hours. The solution is cooled and added to 1.0 g. of anhydrous sodium acetate. The solution is diluted with 60 ml. of water and the methanol is partially removed in vacuo until crystal form. The mixture is cooled in an ice-bath and the solid is collected to give 2.2 g. of ester, m.p. 116°–118°C.

EXAMPLE 6

Preparation of methyl
3-(p-2,2,2-trifluoroacetamidobenzoyl)-butyrate

A mixture of 11.8 g. of methyl 3-(p-aminobenzoyl)-butyrate and 25 ml. of trifluoroacetic anhydride is stirred for one hour, then diluted with 370 ml. of ice-water with stirring for an additional hour. The mixture is extracted with methylene chloride and the extracts are washed successively with 1N hydrochloric acid, saline, saturated sodium bicarbonate and saline solution. After drying and evaporation of the solvent, there is obtained methyl 3-(p-2,2,2-trifluoroacetamidobenzoyl)-butyrate as a gum. Addition of ether-petroleum ether to the gum induces crystallization and there is obtained 15.97 g. white solid, m.p. 67°–70°C.

EXAMPLE 7

Preparation of 3-(p-methylaminobenzoyl)butyric acid

To a stirred solution of 15.0 g. of methyl 3-(p-2,2,2-trifluoroacetamidobenzoyl)butyrate and 13.5 ml. of iodomethane in 300 ml. of acetone is added 14.2 g. of powdered potassium hydroxide. The mixture is stirred at reflux temperature for 5 minutes and then the solvent is removed by evaporation. Water (200 ml.) is added to the residue and the mixture is heated again at reflux temperature for 10 minutes. The mixture is cooled and washed with methylene chloride. The alkaline solution is stirred in an ice-bath and rendered acidic (pH 4) by the dropwise addition of 1N hydrochloric acid. The 3-(p-methylaminobenzoyl)butyric acid is collected as tan crystals, m.p. 170°–172°C. A similar preparation recrystallized from acetone-benzene gives white crystals, m.p. 172°–174°C.

EXAMPLE 8

Preparation of 3-(p-ethylaminobenzoyl)butyric acid

Using the method of Example 7, 4.77 g. (15.0 mmol) of methyl 3-(p-2,2,2-trifluoroacetamidobenzoyl)butyrate, 4.26 g. of powdered potassium hydroxide and 5.25 ml. of ethyl iodide react in 30 ml. of acetone for one hour to give 1.90 g. of tan crystals. A sample is recrystallized from water containing a small amount of methanol to give yellow crystals, m.p. 162°–165°C. dec.

EXAMPLE 9

Preparation of
4,5-dihydro-5-methyl-6-(p-methylaminophenyl)-3-(2H)-pyridazinone

A solution of 570 mg. of 3-(p-methylaminobenzoyl)butyric acid and 0.26 ml. of 99% hydrazine hydrate in 8 ml. of ethanol is heated at reflux temperature for 2 hours. On cooling, there is obtained 360 mg. of 4,5-dihydro-5-methyl-6-(p-methylaminophenyl)-3(2H)-pyridazinone, m.p. 210°–213°C. A sample of this material recrystallized from methanol melts at 213°–215°C.

EXAMPLE 10

Preparation of
4,5-dihydro-2,5-dimethyl-6-(p-methylamino)-3(2H)-pyridazinone

In the manner described in Example 9, from 1.12 g. of 3-(p-methylaminobenzoyl)butyric acid and 0.67 ml. of methyl hydrazine in 5 ml. of ethanol, there is obtained 730 mg. of 4,5-dihydro-2,5-dimethyl-6-(p-methylaminophenyl)-3(2H)-pyridazinone, m.p. 212°–214°C.

EXAMPLE 11

Preparation of
6-(p-ethylaminophenyl)-4,5-dihydro-5-methyl-3(2H)-pyridazinone

A solution of 1.50 g. (6.4 mmol) of 3-(p-ethylaminobenzoyl)butyric acid and 1.5 ml. of hydrazine hydrate is heated at reflux temperature for 90 minutes. The solution is cooled to give 1.15 g. of pale yellow crystals, m.p. 195°–196°C.

EXAMPLE 12

Preparation of N-methyl-4'(1,4,5,6,-tetrahydro-4-methyl-6-oxo-3-pyridazinyl)acetanilide A mixture of 500 mg. of 4,5-dihydro-5-methyl-6-(p-methylaminophenyl)-3(2H)-pyridazinone and 2 ml. of acetic anhydride is stirred for one hour. Ice-water (20 ml.) is added and stirring is continued for an additional 40 minutes. The product is collected as 500 mg. of white solid, m.p. 220°–222°C. Recrystallization from methylene chloride-hexane affords crystals, m.p. 218°–220°C.

EXAMPLE 13

Preparation of
N-methyl-4'-(1,4,5,6-tetrahydro-1,4-dimethyl-6-oxo-3-pyridazinyl)acetanilide In the manner described for Example 12, from 500 mg. of 4,5-dihydro-2,5-dimethyl-6-(p-methylaminophenyl)-2(2H)-pyridazinone and 2 ml. of acetic anhydride there is obtained 525 mg. of product as white crystals, m.p. 105°–109°C. Recrystallization from ether-petroleum ether raised the m.p. to 110°–112°C.

EXAMPLE 14

Preparation of
N-ethyl-4'-(1,4,5,6-tetrahydro-4-methyl-6-oxo-3-pyridazinyl)acetanilide Using the procedure of Example 12, 0.41 g. (1.77 mmol) of 6-(p-ethylaminophenyl)-4,5-dihydro-5-methyl-3(2H)-pyridazinone and 1.2 ml. of acetic anhydride is stirred at room temperature for 3 hours and poured onto a cracked ice-water mixture. The solution which results is extracted with methylene chloride, and the dried extracts are evaporated. The residue is recrystallized from acetone-hexane to give 205 mg. of white crystals, m.p. 148°–150°C.

We claim:

1. A therapeutic composition in dosage unit form useful for lowering blood pressure in mammals comprising from about 50 mg. to about 1.0 gram per daily dosage unit of 6-(N-ethyl-p-acetamidophenyl)-5-methyl-4,5-dihydro-3(2H)-pyridazinone and a pharmaceutical carrier.

2. A therapeutic composition in dosage unit form useful for lowering blood pressure in mammals comprising from about 50 mg. to about 1.0 gram per daily dosage unit of 6-(N-methyl-p-acetamidophenyl)-2,5-dimethyl-4,5-dihydro-3(2H)-pyridazinone and a pharmaceutical carrier.

3. A therapeutic composition in dosage unit form useful for lowering blood pressure in mammals comprising from about 50 mg. to about 1.0 gram per daily dosage unit of a compound selected from the group consisting of 6-(p-methylaminophenyl)-5-methyl-4,5-dihydro-3(2H)-pyridazinone and the non-toxic acid-addition salts thereof, and a pharmaceutical carrier.

4. A therapeutic composition in dosage unit form useful for lowering blood pressure in mammals comprising from about 50 mg. to about 1.0 gram per daily dosage unit of a compound selected from the group consisting of 6-(p-methylaminophenyl)-2,5-dimethyl-4,5-dihydro-3(2H)-pyridazinone and the non-toxic acid-addition salts thereof, and a pharmaceutical carrier.

5. A therapeutic composition in dosage unit form useful for lowering blood pressure in mammals comprising from about 50 mg. to about 1.0 gram per daily dosage unit of a compound selected from the group consisting of 6-(p-ethylaminophenyl)-2,5-dimethyl-4,5-dihydro-3(2H)-pyridazinone and the non-toxic acid-addition salts thereof, and a pharmaceutical carrier.

6. A therapeutic composition in dosage unit form useful for lowering blood pressure in mammals comprising from about 50 mg. to about 1.0 gram per daily dosage unit of a compound selected from the group consisting of 6-(p-ethylaminophenyl)-5-methyl-4,5-dihydro-3(2H)-pyridazinone and the non-toxic acid-addition salts thereof, and a pharmaceutical carrier.

7. The method of lowering blood pressure in a mammal which comprises administering internally to said mammal an effective amount of 6-(N-ethyl-p-acetamidophenyl)-5-methyl-4,5-dihydro-3(2H)-pyridazinone in association with a pharmaceutical carrier to provide a daily dosage of from about one mg. to about 15 mg. per kilogram of body weight of said mammal.

8. The method of lowering blood pressure in a mammal which comprises administering internally to said mammal an effective amount of 6-(N-methyl-p-acetamidophenyl)-2,5-dimethyl-4,5-dihydro-3(2H)-pyridazinone in association with a pharmaceutical carrier to provide a daily dosage of from about one mg. to about 15 mg. per kilogram of body weight of said mammal.

9. The method of lowering blood pressure in a mammal which comprises administering internally to said mammal an effective amount of a compound selected from the group consisting of 6-(p-methylaminophenyl)-5-methyl-4,5-dihydro-3(2H)-pyridazinone and the non-toxic acid-addition salts thereof, in association with a pharmaceutical carrier to provide a daily dosage of from about one mg. to about 15 mg. per kilogram of body weight of said mammal.

10. The method of lowering blood pressure in a mammal which comprises administering internally to said mammal an effective amount of a compound selected from the group consisting of 6-(p-methylaminophenyl)-2,5-dimethyl-4,5-dihydro-3(2H)-pyridazinone and the non-toxic acid-addition salts thereof, in association with a pharmaceutical carrier to provide a daily dosage of from about one mg. to about 15 mg. per kilogram of body weight of said mammal.

11. The method of lowering blood pressure in a mammal which comprises administering internally to said mammal an effective amount of a compound selected from the group consisting of 6-(p-ethylaminophenyl)-2,5-dimethyl-4,5-dihydro-3(2H)-pyridazinone and the non-toxic acid-addition salts thereof, in association with a pharmaceutical carrier to provide a daily dosage of from about one mg. to about 15 mg. per kilogram of body weight of said mammal.

12. The method of lowering blood pressure in a mammal which comprises administering internally to said mammal an effective amount of a compound selected from the group consisting of 6-(p-ethylaminophenyl)-5-methyl-4,5-dihydro-3(2H)-pyridazinone and the non-toxic acid-addition salts thereof, in association with a pharmaceutical carrier to provide a daily dosage of from about one mg. to about 15 mg. per kilogram of body weight of said mammal.

* * * * *